United States Patent [19]

Hertrich

[11] Patent Number: 4,662,049
[45] Date of Patent: May 5, 1987

[54] MECHANISM FOR JOINING TAPE LEADERS

[75] Inventor: Friedrich R. Hertrich, Boulder, Colo.

[73] Assignee: Digital Equipment Corporation, Maynard, Mass.

[21] Appl. No.: 578,766

[22] Filed: Feb. 13, 1984

[51] Int. Cl.⁴ ............................................ B23P 19/04
[52] U.S. Cl. .................................................... 29/267
[58] Field of Search ................ 29/270, 283, 267, 244; 226/90, 91; 242/195; 81/3 R

[56] References Cited

U.S. PATENT DOCUMENTS 3,706,423  12/1972  Neff ................................... 242/195

Primary Examiner—Robert C. Watson
Attorney, Agent, or Firm—William E. Cleaver

[57] ABSTRACT

The present system is comprised of an elongated member which has a finger like protrusion and a cam protrusion both of which are disposed close to one end thereof. The elongated member has an elongated slot at one end which fits over a stud and is further rotationally coupled to a crank so that the elongated member can pivot around said stud in a number of different positions in response to the crank being moved. The crank is rotationally coupled to a cam follower and the crank is further arranged to rotate about a stud. When a tape leader from a take up reel is to be joined to a tape leader from a supply reel, the elongated member is moved toward the tape leader from the take up reel and the finger like protrusion enters a first slot in the take up reel leader and moves that leader to an extended position whereat the cam protrusion cams a tab on the end of the take up reel leader away from the elongated member. The tab is formed to have a stem section. The supply reel leader which is extended has a locking slot therein which has a first section which fits over the tab. In response to said camming action, the elongated member is moved such that said cam protrusion cams said tab deeply into said locking slot and said tab becomes locked in a narrow section of said locking slot.

6 Claims, 7 Drawing Figures

MECHANISM FOR JOINING TAPE LEADERS

BACKGROUND

In tape handling devices it is necessary to have a reel which is "taking up," or winding the tape that is coming off the supply reel. Very often, in the prior art, the take up reel and the supply reel are not distinguishable because each acts to either "take up" or "supply" depending on which way the tape is being run. It is also true, in the prior art, that both reels are often located in the same housing, such as a cassette.

However there are some applications in the prior art where the supply reel is provided as an entity unto itself and the tape thereon is pulled therefrom onto an "empty" take up reel. A film on a motion picture projector is a typical example. Other uses of this kind are well known. In the prior art, with such arrangements, there has always been a certain amount of human factor involved. For instance in a motion picture projector arrangement, the film is threaded along a group of sprocketed drivers and idlers. In some other arrangements, the tape is pulled from the supply reel and "grabbed" by a vacuum port on the take up reel. In another arrangement the tape is pulled from the supply reel and hand loaded onto a take up reel whereat there is a sheath. The sheath in response to movement of the take up reel, operates to squeeze the tape and hold it in position while the tape winds on itself.

The present system provides a means for a minimum of human intervention in making ready a system to pull tape from a supply reel onto a take up reel.

SUMMARY

The present system is involved (in a preferred embodiment) with two tape leaders which in and of themselves are novel. The tape leader from the take up reel has a tab on its end which (in a preferred embodiment) is substantially mushroom shaped including a stem section. Below the stem section there is located a positioning slot. The tape leader from the supply reel has a locking slot in close proximity to its end. The locking slot is wide enough at one section to pass over the tab and is narrow enough at another section (in the end of the locking slot) so that as the tab is moved into that end, the stem passes through but the tab becomes blocked. The leader per se are the subject of my co-pending patent application, "Means for Pulling Tape From A Real" U.S. Ser. No. 6,579,776.

The mechanism for joining the tape leaders, which is the subject matter of the present application, includes an elongated member which has a finger like protrusion and a cam protrusion at one end thereof. At the other end, the elongated member has a relatively long aperture which is fitted over a stud. The elongated member can rotationally and linearly move about said stud. In addition the elongated member is rotationally coupled to a crank. The crank is in turn rotationally coupled to a cam follower as well as a pivot means. The crank, cam follower and elongated member are arranged so that when the housing, which holds a supply reel, is moved toward the mechanism for joining the tape leaders, it (the housing) bumps into and moves the cam follower. The mechanism operates such that initially the elongated member engages the tape leader from the take up reel and moves the tab to an extended position. Thereafter the locking slot in the supply reel leader passes over the tab as the housing of the supply reel is moved toward the mechanism for joining tape leaders. At this point of the operation the tab is cammed through the slot by the cam protrusion of the elongated member. Subsequently as the housing moves against the cam follower the elongated member moves in a translational fashion to cam the tab into a position so that in response to pulling the take up leader, the take up leader tab becomes locked in the locking slot of the supply tape leader. As the housing for the supply reel is moved further toward its operating position (and continues to move the cam follower) the elongated member is moved so that the finger like protrusion is retracted out of the positioning slot and the cam protrusion is directed away from the locked leaders. Accordingly the take up leader and the supply tape leader are locked, or buckled, for the operation of moving the tape from the supply reel, past a read head, onto the take up reel.

The objects and features of the present invention will be better understood in view of the following description studied in conjunction with the drawings wherein.

Figure 1:
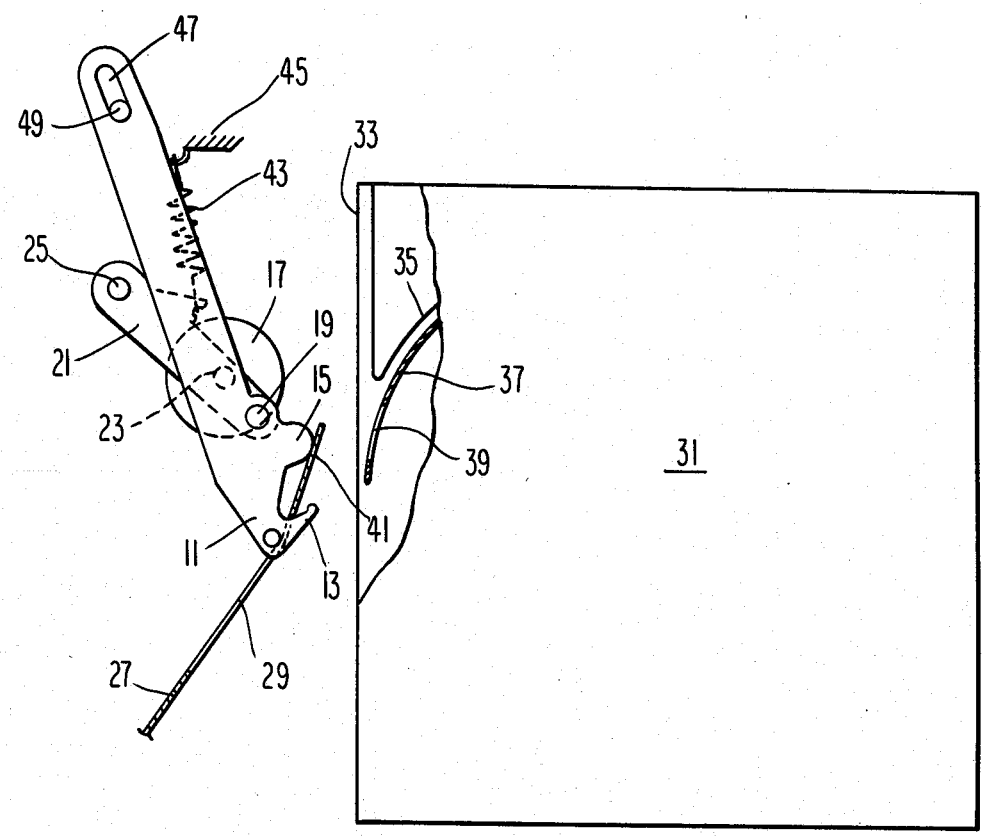
FIG. 1 depicts the elongated member holding the take up leader prior to locking it in the supply tape leader.

Consider FIG. 1. In FIG. 1 there is shown an elongated member 11. As can be seen in FIG. 1, the lower end of the elongated member 11 it is formed into a finger like protrusion 13 and a cam protrusion 15. Also as can be seen in FIG. 1, the elongated member 11 is coupled to a crank 21 by a stud 19. The crank 21 is rotationally coupled by a stud 23 to a cam follower 17. The crank 21 is rotationally coupled to a stud 25. As will become apparent, hereinafter, the function of the linkage arrangement (i.e. the crank 21, the cam follower 17 and their rotational coupling design) is to enable the elongated member to first pull the take up reel leader into an extended position for joining with the supply reel leader; secondly cam the tab of the take up leader into the locking slot of the supply tape leader; and thirdly retract the finger like protrusion from the positioning slot of the take up leader and simultaneously move the cam protrusion "out of the way" when the leaders have been joined together. Other forms of mechanical linkage arrangement could be used to maneuver the elongated member so as to accomplish its purpose.

In FIG. 1 the take up leader 27 is shown with the finger like protrusion 13 fitted through the positioning slot 29. The positioning slot 29 can be seen in FIGS. 5 (A, B and C) and is depicted in FIG. 1 as a clear section of the leader as opposed to a solid line. Also in FIG. 1 a top view of a portion of the housing 31 of the supply reel is shown. It should be understood that the housing 31 is three dimensional extending up from the drawing toward the viewer and that its lower edge 33 serves as a cam. The lower edge 33 moves the cam follower 17 as the housing 31 is moved to the left of the drawing to its ultimate operating position.

The housing 31 moves within two guide rails, not shown, and comes to rest against a bumper means when it is in the correct operating position. The guide rails and the bumper enable the user to quickly insert the cartridge, (i.e. the housing 31 with the supply reel located therein) and to automatically join the two leaders.

As can be seen in FIG. 1, the housing 31 has a channel 35 formed therein from whence the supply tape leader 37 extends. The supply tape leader 37 has a locking slot 39 which can be readily seen in FIG. 5 (A, B and C) and which is shown as a clear area in FIG. 1. It should be understood that (in a preferred embodiment) the leaders 27 and 37 are made of a polyester material with a thickness of 0.004 to 0.010 mils. Accordingly the leaders are relatively stiff to accommodate the automatic maneuvering of the tab into the locking slot. The tab which has been mentioned above is depicted in FIG. 1 as tab 41. The shape of the tab 41 can be better appreciated in FIG. 5. While in a preferred embodiment the tab 41 is shown to substantially resemble a mushroom, other shapes could be used.

It should be further noted that the crank 21 is spring loaded by the spring 43 to move the linkage arrangement against the stop stud 45. When the linkage is moved against the stop stud 45 the take up leader 27 is in the correct position to be inserted into the locking slot of the supply tape leader 37. While it is preferable to spring load the mechanism it will operate without spring loading provided the linkage is moved to properly locate the tab 41.

It should be noted that at the top end of the elongated member 11 there is formed an elongated aperture 47. The aperture 47 fits over the stud 49 and such an arrangement permits the elongated member 11 to move both rotationally and linearly, which translational movement is needed to enable the elongated member to cam the tab into the locking slot and at a later time move it "out of the way".

Figure 2:
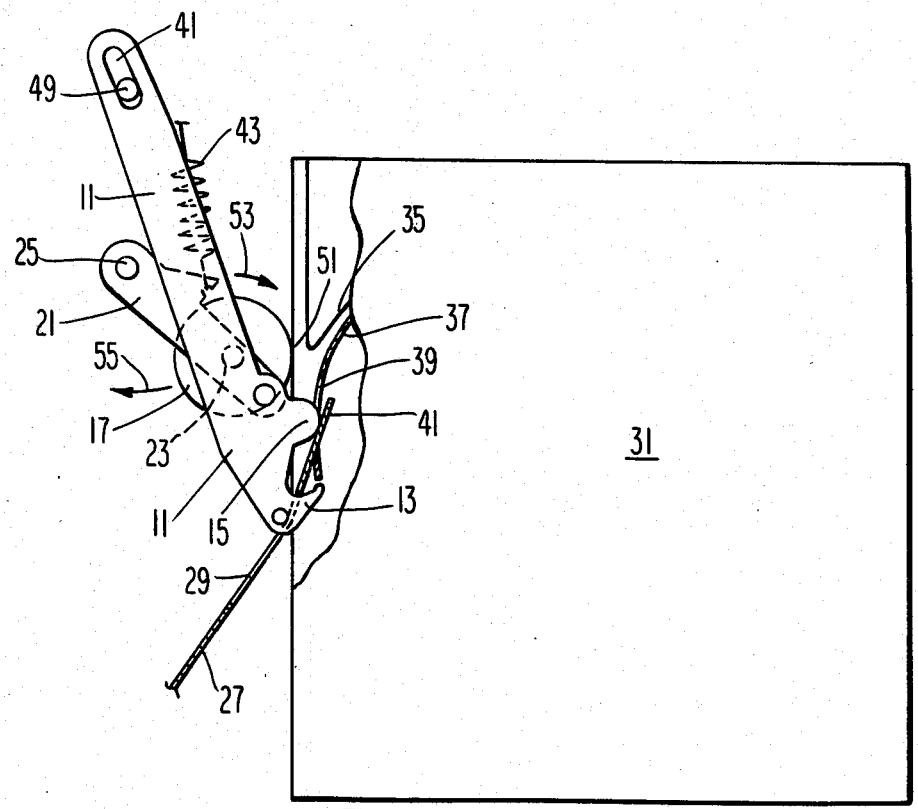
FIG. 2 depicts the tab of the take up leader when it is first inserted into the locking slot at the supply tape leader.

Consider FIG. 2. In FIG. 2 the housing 31 is shown in a position where its lower edge 33 is about to commence moving, or camming, the cam follower 17. In this initial camming position, the cam protrusion 15 has pushed the tab 41 substantially through the locking slot 39. It should be understood that depending upon the design of the leaders and the wishes of the user, the elongated member 11, the linkage arrangement and in particular the cam protrusion 15 can all be designed to move the tab 41 more or less completely through the locking slot 39. In FIG. 2 it can be seen that the lower edge 33 abuts the cam follower 17 at point 51.

As the housing 31 is moved to the left, within its guide rails, it pushes the cam follower 17 which "rolls", as shown by arrow 53, and pivots around the stud 23. In addition the crank 21 commence a slight rotational movement (arrow 55) about the stud 25. The foregoing movement of the linkage causes the cam protrusion 15 to cam or push, the tab 41 further into the locking slot as the locking slot is pushed toward the cam protrusion 15.

Figure 3:
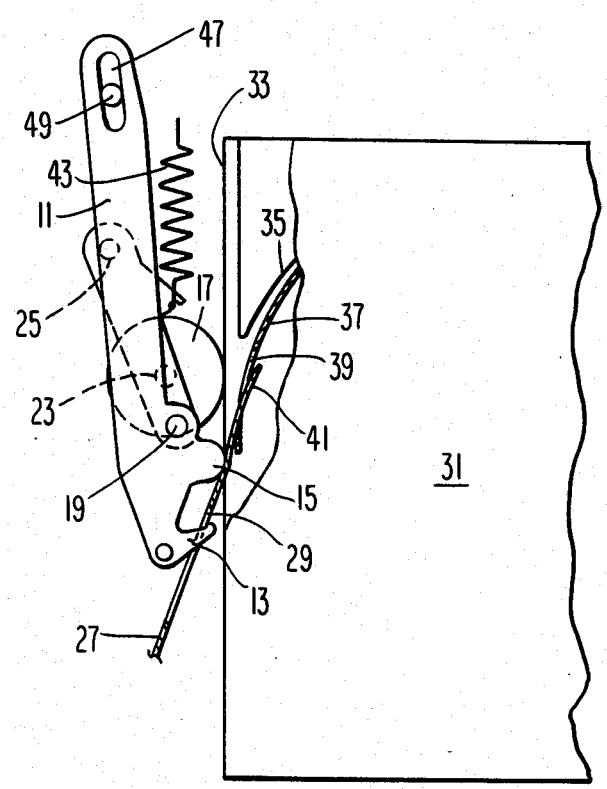
FIG. 3 depicts the arrangement as the housing of the supply reel moves the cam follower.

Consider FIG. 3. In FIG. 3 the housing 31 is shown moved considerably to the left. Under the conditions shown in FIG. 3, the housing 31 has not yet gotten to the end of its travel, i.e. into its operating position. However in the intermediate position shown in FIG. 3, the tab 41 is shown pushed well into the locking slot 39. As can be determined from FIG. 5A when the tab 41 is well into the slot, the stem 57 is located in the narrow section 59 so that as the take up leader 27 is moved away from (in a pulling direction) the supply tape leader 37, the stem 57 will pass through the narrow section 59 but the tab 41 will be blocked. To say it another way, the overlap sections 61 and 63 will abut the outer limits 65 and 67 of the narrow section 59 and the leaders will become buckled. At this point in the buckling procedure the take up leader is pulled toward the bottom of the drawing to cause the stem 57 to pass through the narrow section 59 while the tab becomes blocked. The pulling can be effected by providing power to the take up reel or by manually winding the take up reel.

Figure 4:
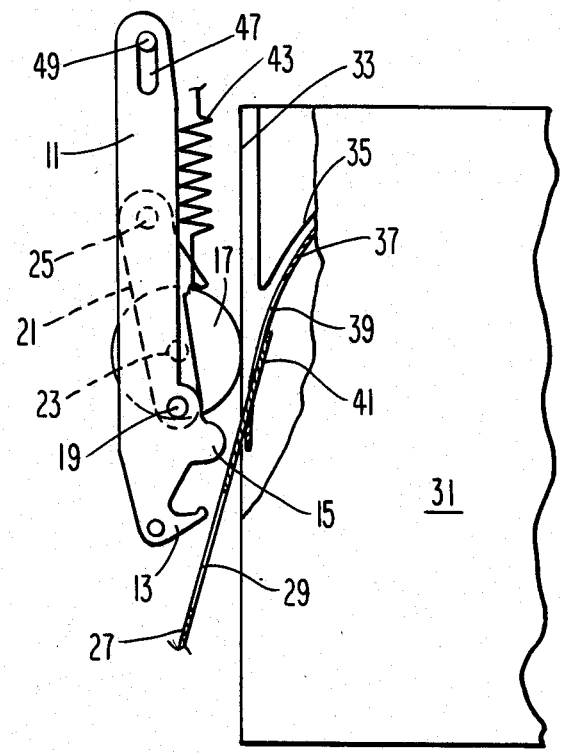
FIG. 4 depicts the arrangement when the housing of the supply reel reaches its operating position.

Consider FIG. 4. In FIG. 4 the housing 31 is shown having been moved considerably to the left to come into contact with bumper 69. In FIG. 4 the housing 31 is shown in its operating position. As can be seen in FIG. 4 the elongated member 11 has been moved away from the take up leader. The finger like protrusion 13 has slipped out of the positioning slot 29 and the cam protrusion 15 has moved out of the locking slot 39. As can be further seen in FIG. 4 the tape leaders 27 and 37 are joined for operation, that is the pulling of the supply tape from the housing 31 and the taking up thereof by the take up reel.

Figures 5A, 5B, 5C:
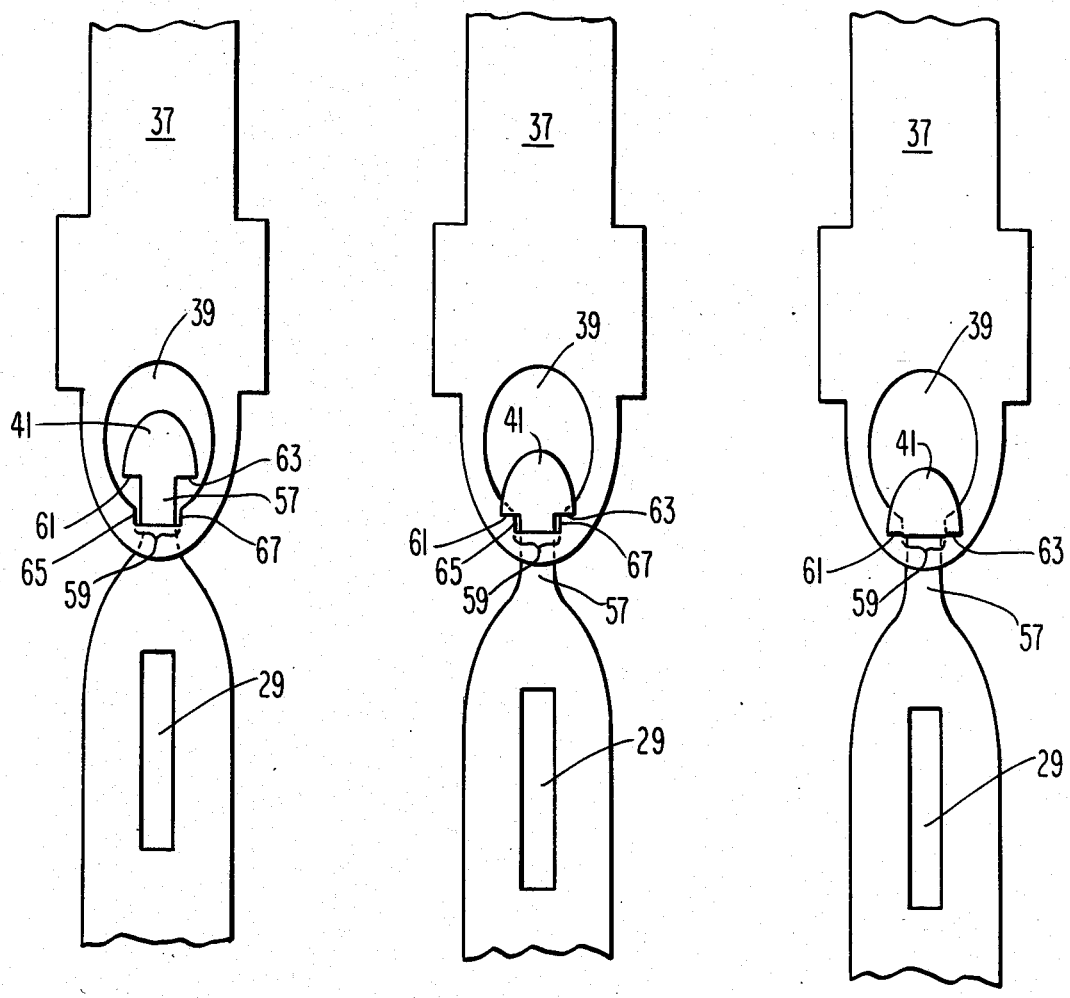
FIGS. 5A, 5B and 5C depict the take up leader and supply tape leader in succeeding stages of being buckled.

FIGS. 5 (A, B, and C) show the take up reel leader 27 being inserted in three steps into the supply tape leader 37. The prerequisites for the leaders 27 and 37 is that they be stiff enough to accommodate the operation described, that one section of the locking slot be wide enough to accept the tab and that another section be narrow enough to pass the stem but block the tab when the take up leader is pulled. These features and their relationship is apparent from FIGS. 5A, 5B and 5C.

It should be recognized that the joining of the leaders is quite automatic in response to the supply reel housing being inserted into its operating position as described above.

I claim:

1. A mechanism for joining a first tape leader with a second tape leader wherein said first tape leader is formed to have a tab at an end thereof and is further formed to have a positioning slot therein, and wherein said second tape leader is formed to have a locking slot therein which locking slot is formed along a first section to be sufficiently wide to permit said tab to pass therethrough and formed at a second section to be sufficiently narrow to prevent said tab from passing therethrough, comprising in combination: an elongated member formed to have a finger like protrusion, said finger like protrusion disposed so that when said elongated member is directed in a first movement said protrusion fits into said positioning slot and moves said tab into an extended position, said elongated member further formed to have a cam protrusion which is disposed such that in response to said first movement said tab is cammed thereby in a first direction; translational linkage means coupled to said elongated member and formed to move said elongated member in said first movement whereby, when said locking slot lies opposite said tab, said tab is cammed in said first direction through said locking slot to be ultimately locked in said second section thereof.

2. A mechanism for joining a first tape leader with a second tape leader according to claim 1 wherein said translational linkage means includes a cam follower which is disposed such that when it is cammed in a first portion of a second movement said cam protrusion further cams said tab through said locking slot whereby said first tape leader, in response to a force pulling it in a direction away from said second tape leader will have said tab locked in said second section of said locking slot.

3. A mechanism for joining a first tape leader with a second tape leader according to claim 2 wherein said translational linkage is formed such that when said cam follower is cammed along a second portion of said second movement said cam protrusion is moved away from said tab and said finger like protrusion is retracted out of said positioning slot to permit said first tape leader to be locked to said second tape leader for pulling thereof and for pulling whatever tape might be connected thereto.

4. A mechanism for joining a first tape leader with a second tape leader according to claim 2 wherein there is included a crank means which is rotationally coupled to a stud and which is further rotationally coupled to said cam follower whereby when said cam follower is moved it rotationally moves through said crank, around said last mentioned stud to in turn move said elongated member out of said positioning slot.

5. A mechanism for joining a first tape leader with a second tape leader according to claim 1 wherein said elongated member is formed to have an elongated aperture at the end thereof which is away from said finger like protrusion and wherein said elongated slot fits over a stud so that said elongated member can move rotationally and linearly with respect to said last mentioned stud.

6. A mechanism for joining a first tape leader with a second tape leader wherein said first tape leader is formed to have a tab at an end thereof and is further formed to have a positioning slot therein; and wherein said second tape leader is formed to have a locking slot therein which locking slot is formed along a first section to be sufficiently wide to permit said tab to pass therethrough and formed at a second section to be sufficiently narrow to prevent said tab from passing therethrough, comprising in combination: an elongated member formed to have a finger like protrusion, said finger like protrusion disposed so that when said elongated member is directed in a first movement said protrusion fits into said positioning slot and moves said tab into an extended position, said elongated member further formed to have a cam protrusion which is disposed such that in response to said first movement said tab is cammed thereby in a first direction; crank means rotationally coupled to said elongated member and rotationally coupled to a first stud; cam follower means rotationally coupled to said crank means whereby when said cam follower is moved, it rotationally moves said crank around said first stud and thus said elongated member is moved in said first movement so that when said locking slot lies opposite said tab, said tab is cammed in said first direction through said locking slot to be ultimately locked in said second section thereof.

* * * * *